(12) United States Patent
Eagleman et al.

(10) Patent No.: US 10,181,331 B2
(45) Date of Patent: Jan. 15, 2019

(54) METHOD AND SYSTEM FOR TRANSFORMING LANGUAGE INPUTS INTO HAPTIC OUTPUTS

(71) Applicant: NeoSensory, Inc., Palo Alto, CA (US)

(72) Inventors: David Eagleman, Palo Alto, CA (US); Scott Novich, Palo Alto, CA (US)

(73) Assignee: NEOSENSORY, INC., Palo Alto, CA (US)

( * ) Notice: Subject to any disclaimer, the term of this patent is extended or adjusted under 35 U.S.C. 154(b) by 0 days.

(21) Appl. No.: 15/795,054

(22) Filed: Oct. 26, 2017

(65) Prior Publication Data

US 2018/0233163 A1    Aug. 16, 2018

Related U.S. Application Data

(60) Provisional application No. 62/460,028, filed on Feb. 16, 2017, provisional application No. 62/486,319, filed on Apr. 17, 2017.

(51) Int. Cl.
| | | |
|---|---|---|
| *G06F 3/01* | (2006.01) | |
| *G08B 6/00* | (2006.01) | |
| *G10L 13/00* | (2006.01) | |
| *G10L 15/02* | (2006.01) | |
| *G10L 15/22* | (2006.01) | |
| *G10L 21/16* | (2013.01) | |

(52) U.S. Cl.
CPC .............. *G10L 21/16* (2013.01); *G06F 3/016* (2013.01); *G08B 6/00* (2013.01); *G10L 13/00* (2013.01); *G10L 15/02* (2013.01); *G10L 15/22* (2013.01); *G10L 2015/025* (2013.01)

(58) Field of Classification Search
CPC .......... B60Q 9/00; G08B 6/00; G08B 21/182; B29C 35/0805; B29C 44/12; B29C 45/14065; B60R 16/005; G01N 27/041
See application file for complete search history.

(56) References Cited

U.S. PATENT DOCUMENTS

| | | | |
|---|---|---|---|
| 4,926,879 | A | 5/1990 | Sevrain et al. |
| 5,553,148 | A | 9/1996 | Werle |
| 6,272,466 | B1 | 8/2001 | Harada et al. |
| 6,671,618 | B2 | 12/2003 | Hoisko |

(Continued)

FOREIGN PATENT DOCUMENTS

| | | |
|---|---|---|
| WO | 106698 | 9/2008 |
| WO | 069429 | 5/2012 |

OTHER PUBLICATIONS

Plant, Geoff, "Training in the use of the Tactaid VII: A case study", KTH Computer Science and Communication (STL-QPSR), 1994, vol. 35, No. 1, pp. 091-102.

*Primary Examiner* — Thomas S McCormack
(74) *Attorney, Agent, or Firm* — Jeffrey Schox

(57) ABSTRACT

A method for transforming input information into outputs, preferably including: receiving input information; transforming the input information into a set of intermediary components; implementing a transformation model with the set of intermediary components, the transformation model operable to encode the set of intermediary components across a set of output parameters in a device domain associated with a device; and executing control signals operable to deliver outputs, based on the set of output parameters, to a user of the device.

18 Claims, 12 Drawing Sheets

(56) References Cited

U.S. PATENT DOCUMENTS

| | | |
|---|---|---|
| 7,146,218 B2 | 12/2006 | Esteller et al. |
| 7,222,075 B2 | 5/2007 | Petrushin |
| 7,921,069 B2 | 4/2011 | Canny et al. |
| 7,979,146 B2 | 7/2011 | Ullrich et al. |
| 8,005,681 B2 | 8/2011 | Hovestadt et al. |
| 8,068,025 B2 | 11/2011 | Devenyi et al. |
| 8,588,464 B2 | 11/2013 | Albertson et al. |
| 8,754,757 B1 | 6/2014 | Ullrich et al. |
| 8,952,888 B2 | 2/2015 | Van Den Eerenbeemd et al. |
| 9,019,087 B2 | 4/2015 | Bakircioglu et al. |
| 9,298,260 B2 | 3/2016 | Karaoguz et al. |
| 9,317,116 B2 | 4/2016 | Ullrich et al. |
| 9,324,320 B1 | 4/2016 | Stolcke et al. |
| 9,443,410 B1 | 9/2016 | Constien |
| 9,613,619 B2 | 4/2017 | Lev-Tov et al. |
| 9,626,845 B2 | 4/2017 | Eagleman et al. |
| 9,659,384 B2 | 5/2017 | Shaji et al. |
| 9,714,075 B2 | 7/2017 | Watkins et al. |
| 9,735,364 B2 | 8/2017 | Cheng et al. |
| 9,905,090 B2 | 2/2018 | Ullrich et al. |
| 9,987,962 B1 | 6/2018 | Salter et al. |
| 2003/0025595 A1 | 2/2003 | Langberg |
| 2005/0113167 A1 | 5/2005 | Buchner et al. |
| 2007/0041600 A1 | 2/2007 | Zachman |
| 2008/0120029 A1 | 5/2008 | Zelek et al. |
| 2008/0140422 A1 | 6/2008 | Hovestadt et al. |
| 2011/0061017 A1 | 3/2011 | Ullrich et al. |
| 2011/0063208 A1 | 3/2011 | Van et al. |
| 2011/0202155 A1 | 8/2011 | Ullrich et al. |
| 2013/0218456 A1 | 8/2013 | Zelek et al. |
| 2013/0265286 A1 | 10/2013 | Da Costa et al. |
| 2014/0064516 A1 | 3/2014 | Cruz-Hernandez et al. |
| 2014/0363138 A1 | 12/2014 | Coviello et al. |
| 2015/0025895 A1 | 1/2015 | Schildbach |
| 2015/0070150 A1 | 3/2015 | Levesque et al. |
| 2015/0161995 A1 | 6/2015 | Sainath et al. |
| 2015/0227204 A1* | 8/2015 | Gipson ........... G06F 3/016 345/156 |
| 2015/0356889 A1 | 12/2015 | Schwartz |
| 2016/0012688 A1* | 1/2016 | Eagleman ........ G06F 3/016 340/407.1 |
| 2016/0027338 A1 | 1/2016 | Ebeling et al. |
| 2016/0103590 A1 | 4/2016 | Vu et al. |
| 2016/0187987 A1 | 6/2016 | Ullrich et al. |
| 2016/0292856 A1 | 10/2016 | Niemeijer et al. |
| 2016/0297611 A1 | 10/2016 | Williams et al. |
| 2016/0358429 A1 | 12/2016 | Ullrich et al. |
| 2017/0169673 A1* | 6/2017 | Billington ........ G06F 3/016 |
| 2017/0206889 A1 | 7/2017 | Lev-Tov et al. |
| 2017/0213568 A1 | 7/2017 | Foshee |
| 2017/0294086 A1* | 10/2017 | Kerdemelidis ..... G08B 6/00 |

* cited by examiner

US 10,181,331 B2

METHOD AND SYSTEM FOR TRANSFORMING LANGUAGE INPUTS INTO HAPTIC OUTPUTS

CROSS-REFERENCE TO RELATED APPLICATIONS

This application claims the benefit of U.S. Provisional Application Ser. No. 62/460,028, filed on 16 Feb. 2017, and U.S. Provisional Application Ser. No. 62/486,319, filed on 17 Apr. 2017, each of which is incorporated in its entirety by this reference.

TECHNICAL FIELD

This invention relates generally to the field of information delivery, and more specifically to a new and useful methods and systems for transforming language inputs into haptic outputs.

BACKGROUND

Perception of information is an important part of an individual's ability to integrate into society, interact with objects in the environment, and perceive and respond to risks. Traditional devices for supporting individuals with sensory impairments, or other related conditions are deficient because they are highly invasive and require surgical implantation, risky (e.g., in terms of success rates, available only to certain demographics (e.g., age demographics), inconvenient to use, and/or expensive. Outside of the context of sensory impairment, it can be useful to have another modality for receiving information (e.g., derived from language inputs, derived from visual sources, derived from audio sources, etc.) when either redundancy is beneficial, or if it is inconvenient or infeasible to receive information using a more conventional modality. Available technologies are still limited in relation to how information from one sense can be encoded and processed using another sense (e.g., with respect to upsampling and downsampling issues, with respect to acuity of sensory receptors for a given sensory modality), density of information that can be processed and encoded, cost, ease of use, and adoption by users.

Thus, there is a need in the field of information delivery for a new and useful method and system for transforming language inputs into haptic outputs. This invention provides such a new and useful method and system.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview.

Figure 1A:
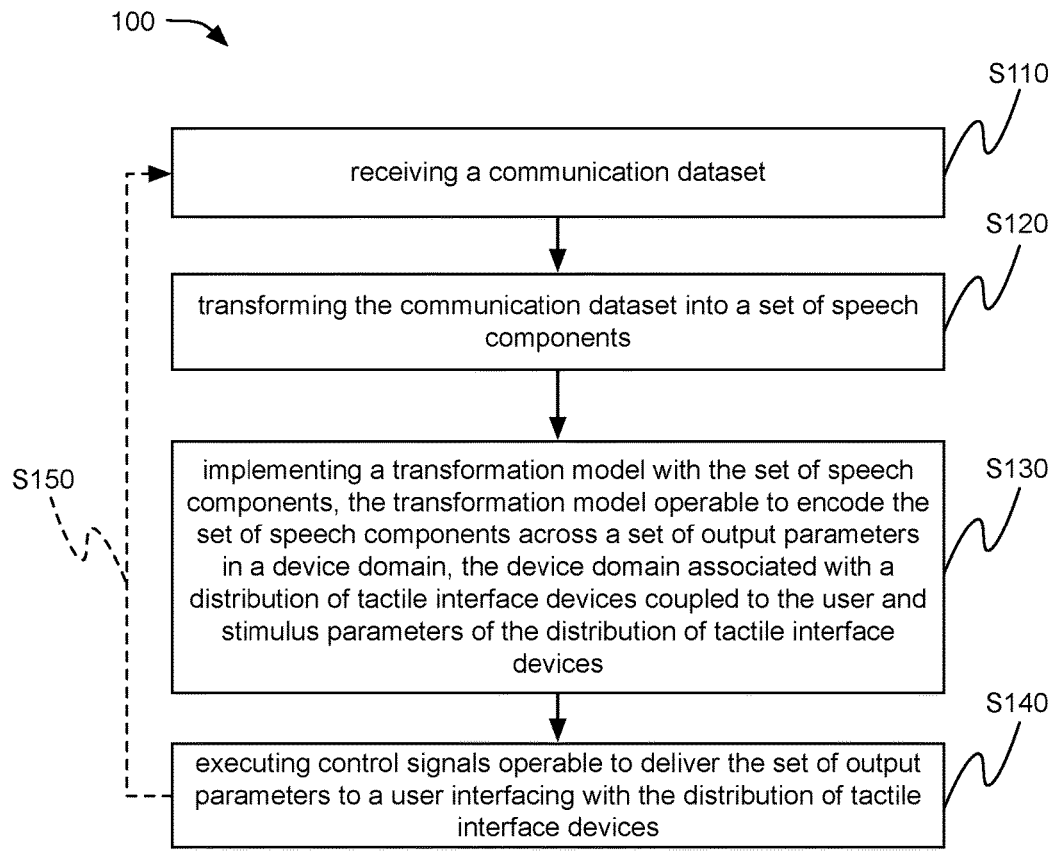
FIGS. 1A and 1B depict schematics of an embodiment of a method for transforming language inputs into haptic outputs.
Figure 1B:
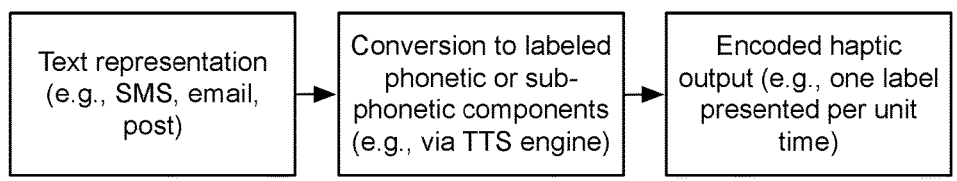
Figure 1C:
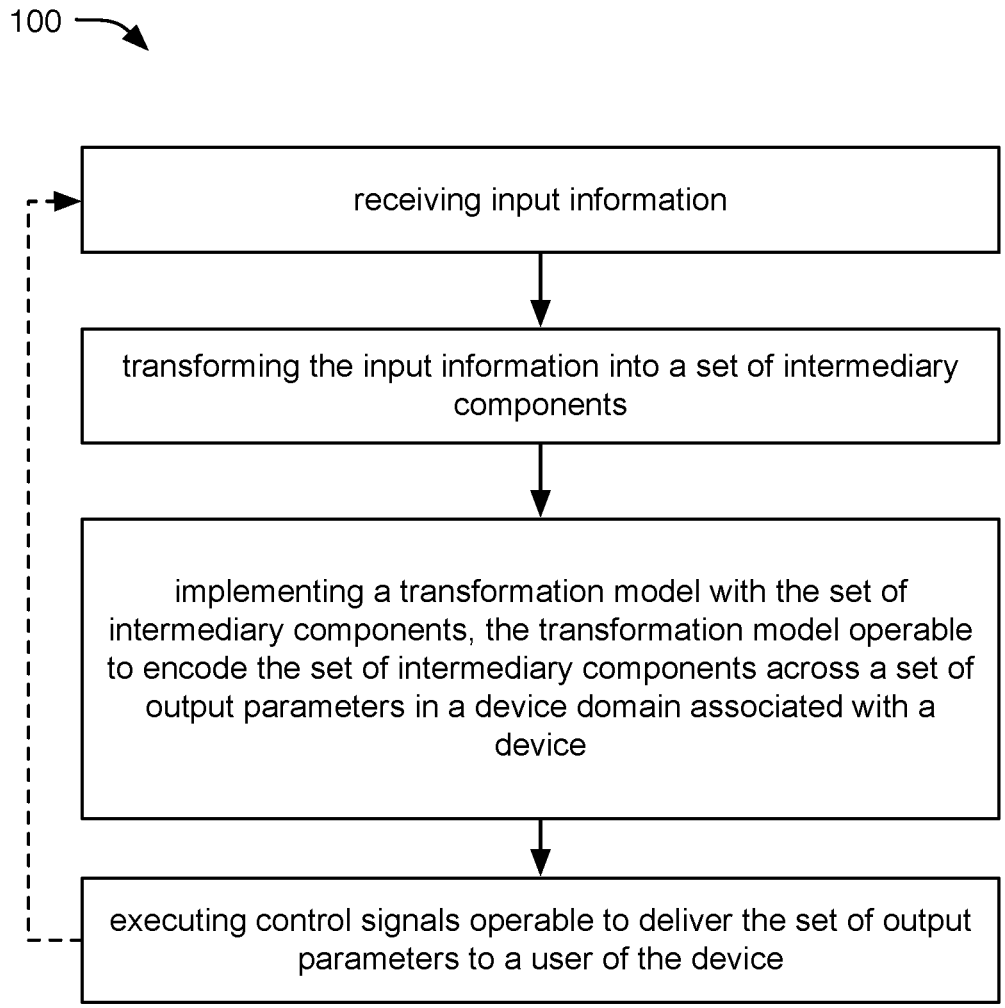
FIG. 1C depicts a schematic representation of the method.
Figure 2:
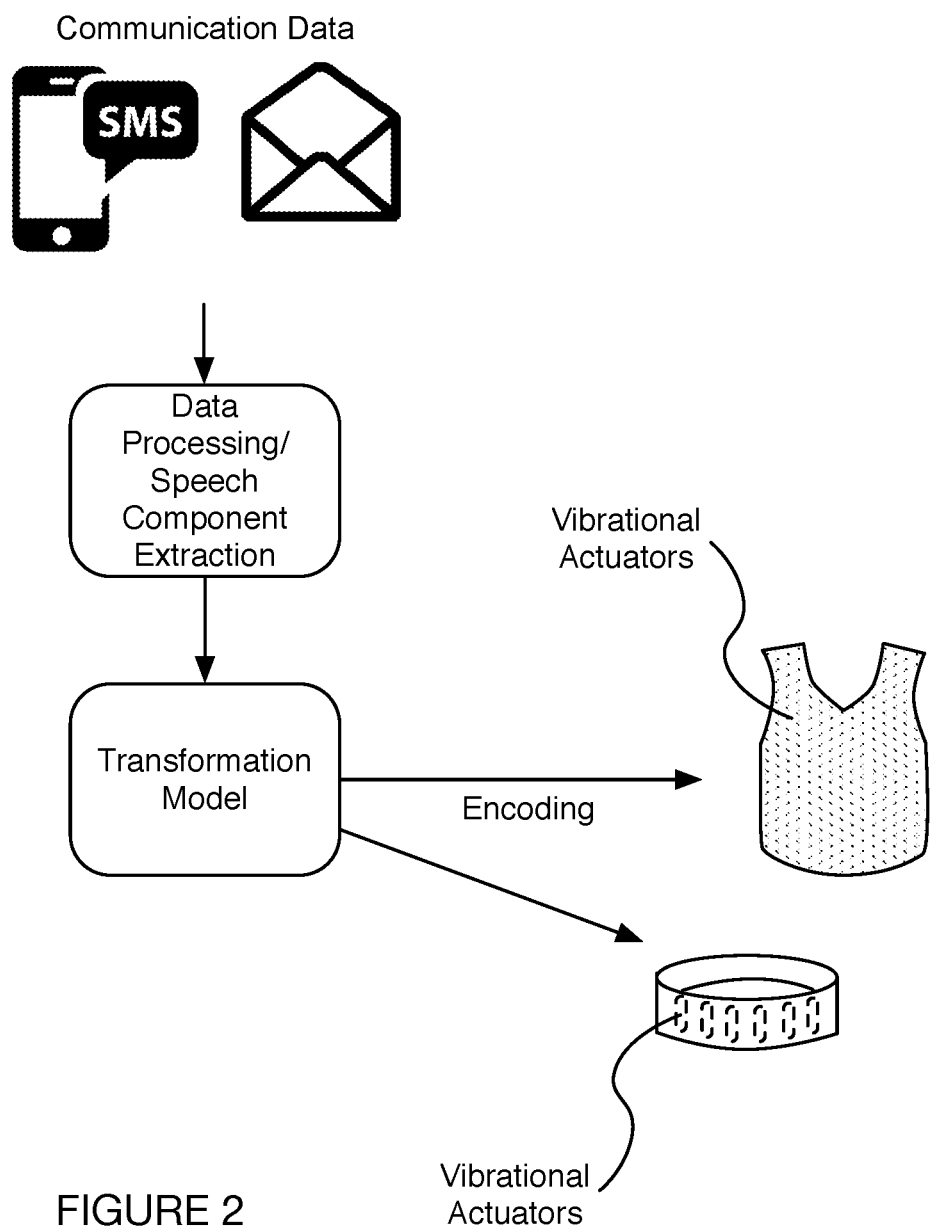
FIG. 2 depicts a schematic of a system and method for transforming language inputs into haptic outputs.

A method 100 for transforming input information into outputs (e.g., for transforming language inputs into haptic outputs) preferably includes (e.g., as shown in FIG. 1C): receiving input information; transforming the input information into a set of intermediary components; implementing a transformation model with the set of intermediary components, the transformation model operable to encode the set of intermediary components across a set of output parameters in a device domain associated with a device; and executing control signals operable to deliver outputs, based on the set of output parameters, to a user of the device; and can optionally include repeating Blocks S110-S140 (e.g., upon reception of additional input information). For example (e.g., as shown in FIGS. 1A, 1B, and/or 2), an embodiment of the method 100 can include: receiving a communication dataset S110; transforming the communication dataset into a set of speech components (or other representative components) S120; implementing a transformation model with the set of speech components, the transformation model operable to encode the set of speech components across a set of output parameters in a device domain, the device domain associated with a distribution of tactile interface devices coupled to the user and stimulus parameters of the distribution of tactile interface devices S130; and executing control signals operable to deliver the set of output parameters to a user interfacing with the distribution of tactile interface devices S140; and can optionally include repeating Blocks S110-S140 upon reception of additional incoming communication datasets S150.

The method 100 preferably functions to convert data associated with communication to another output format that is perceptible by a user through another sensory modality. In specific examples, the method can function to convert textual communication data to outputs perceptible by a user through touch sensation, in a manner that allows the user to perceive the message contained in the textual communication data through touch-based stimuli. As such, textual communication data can be continuously converted to touch-based stimuli using "speech"-style encoding, thereby providing a user with a haptic experience of textual-based communications (e.g., text messages such as messages received via SMS, emails, status updates on social media, transcribed messages, etc.). Alternatively, the method can function to convert data associated with communication to another representation (e.g., a non-speech representation, through another encoding that map source to output in a 1:1 manner).

As such, the method 100 can be adapted to applications involving sensory substitution, whereby a user is unable to visually perceive textual communications (e.g., due to situational factors, due to visual impairments, etc.), but has a fully functioning sensation of touch. Additionally or alternatively, the method 100 can be adapted to applications involving sensory boosting for users for whom improvements in sensory functions of vision and/or touch are beneficial. Additionally or alternatively, the method 100 can be adapted to applications involving users who do not have visual or auditory sensory impairments, but who are performing activities where receiving textual communications would be distracting from the activities being performed (e.g., in relation to driving). Thus, the method 100 can allow a user to receive information that would otherwise be received through a different sensory modality. The method 100 preferably provides information to impaired users through touch sensation, However, the method 100 can additionally or alternatively implement any other suitable sensory substitution or sensory boosting regime.

As such, in specific examples, the method 100 can be used to allow a user to haptically receive communications originating in a textual format in a situation where it would not be beneficial for the user to divide his/her visual attention (e.g., in relation to operating a vehicle, in relation to being in a professional work environment, etc.).

The method 100 can be implemented using system components described in more detail below, and/or using an embodiment, variation, or example of the system described in U.S. application Ser. No. 14/750,626, titled "Providing Information to a User Through Somatosensory Feedback" and filed on 25 Jun. 2015, which is herein incorporated in its entirety by this reference. However, the method 100 can additionally or alternatively be implemented using any other suitable system or system components for providing information to users through feedback devices.

2. System.

Figure 6A:
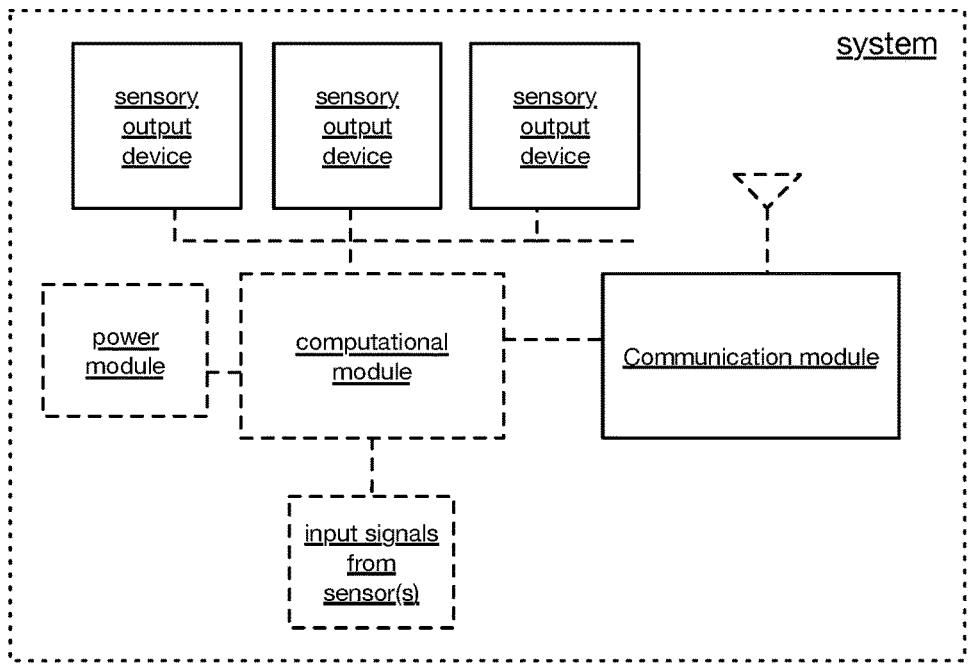
FIGS. 6A-6B are schematic representations of an embodiment of elements of the system and a variation of the embodiment, respectively.
Figure 6B:
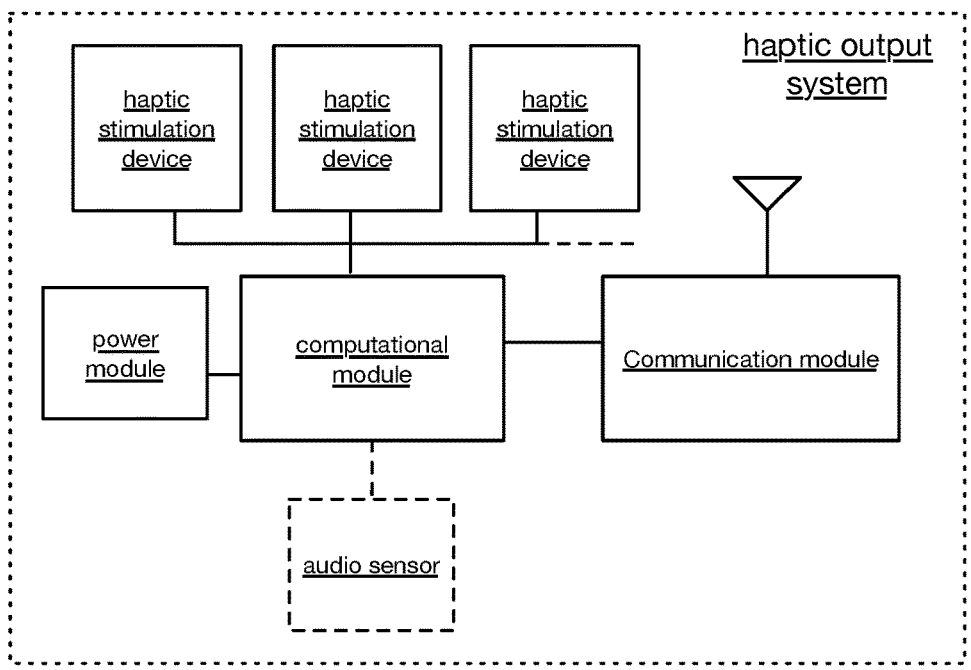
Figure 7A:
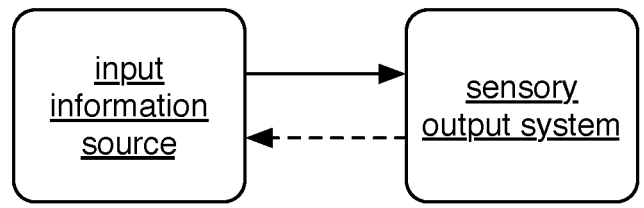
FIGS. 7A-7C are schematic representations of a first, second, and third variation of the system, respectively.
Figure 7B:
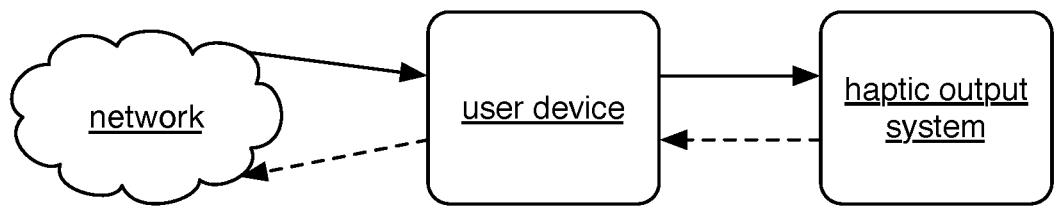
Figure 7C:
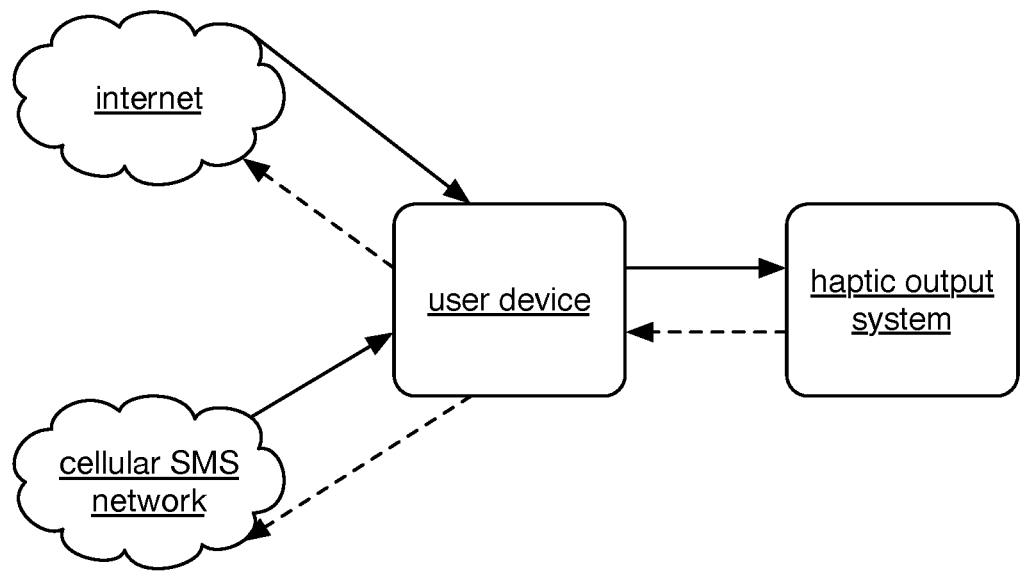
Figure 8A:
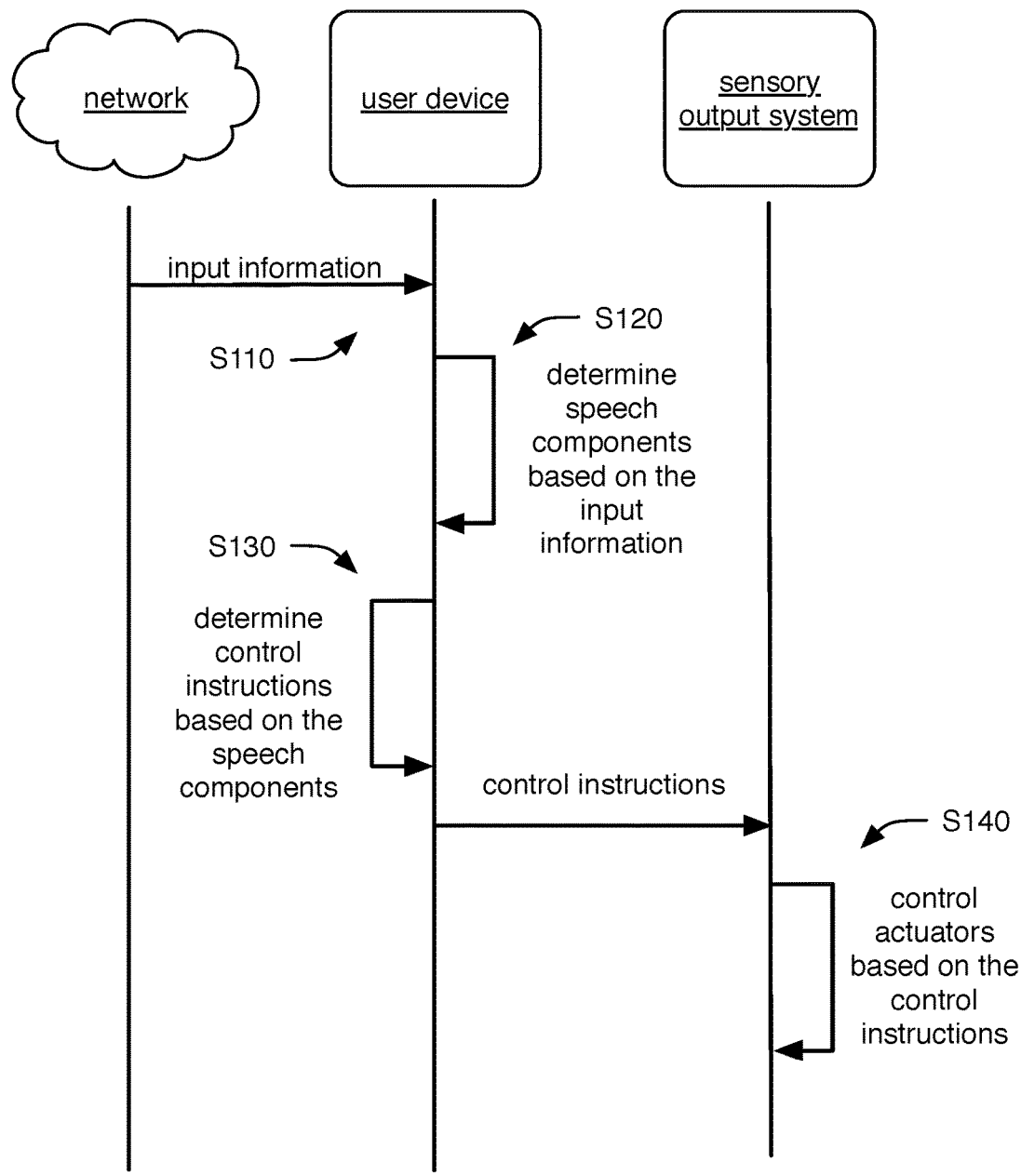
FIGS. 8A-8C are schematic representations of a first, second, and third variation of the method, respectively.
Figure 8B:
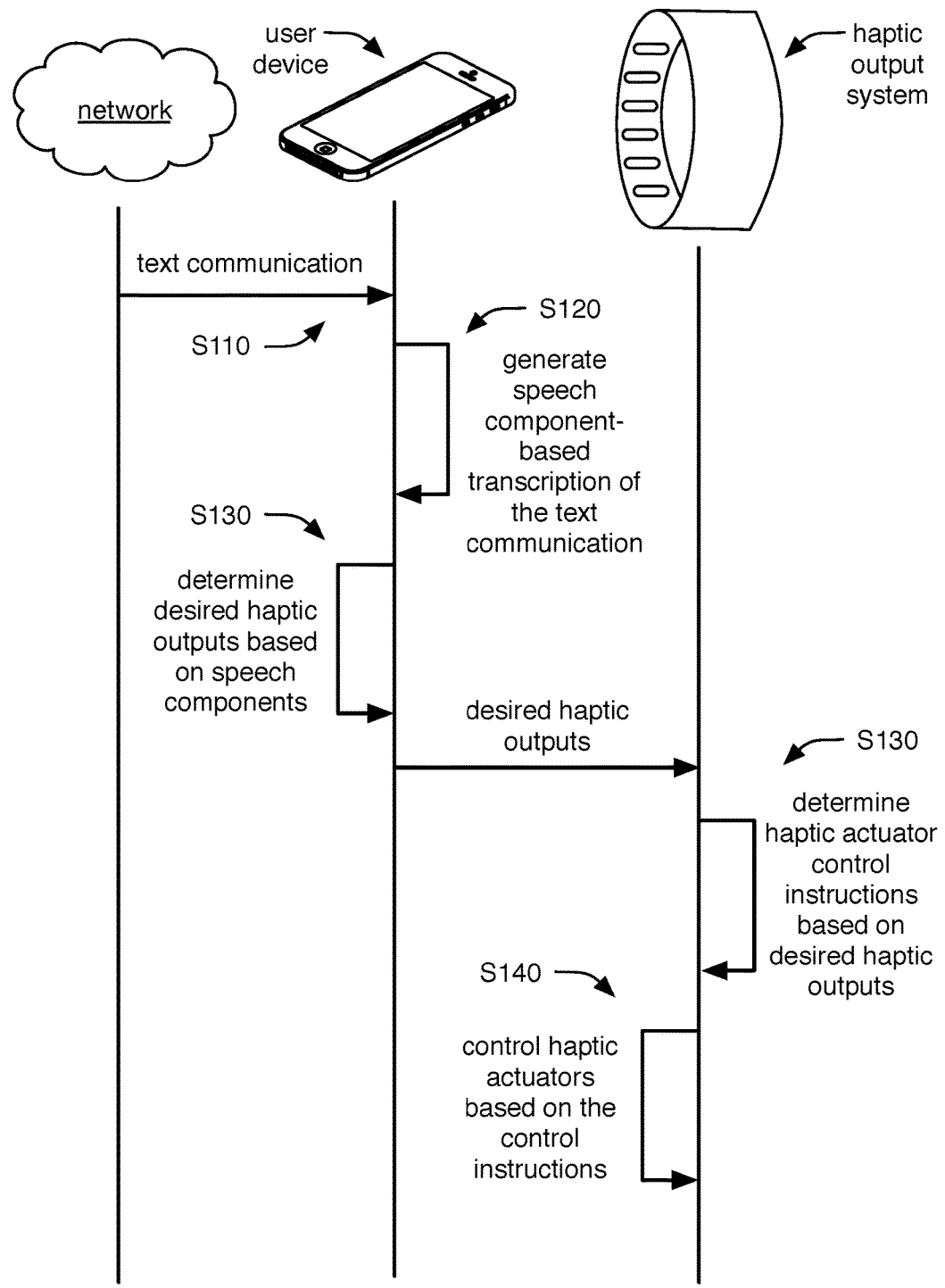
Figure 8C:
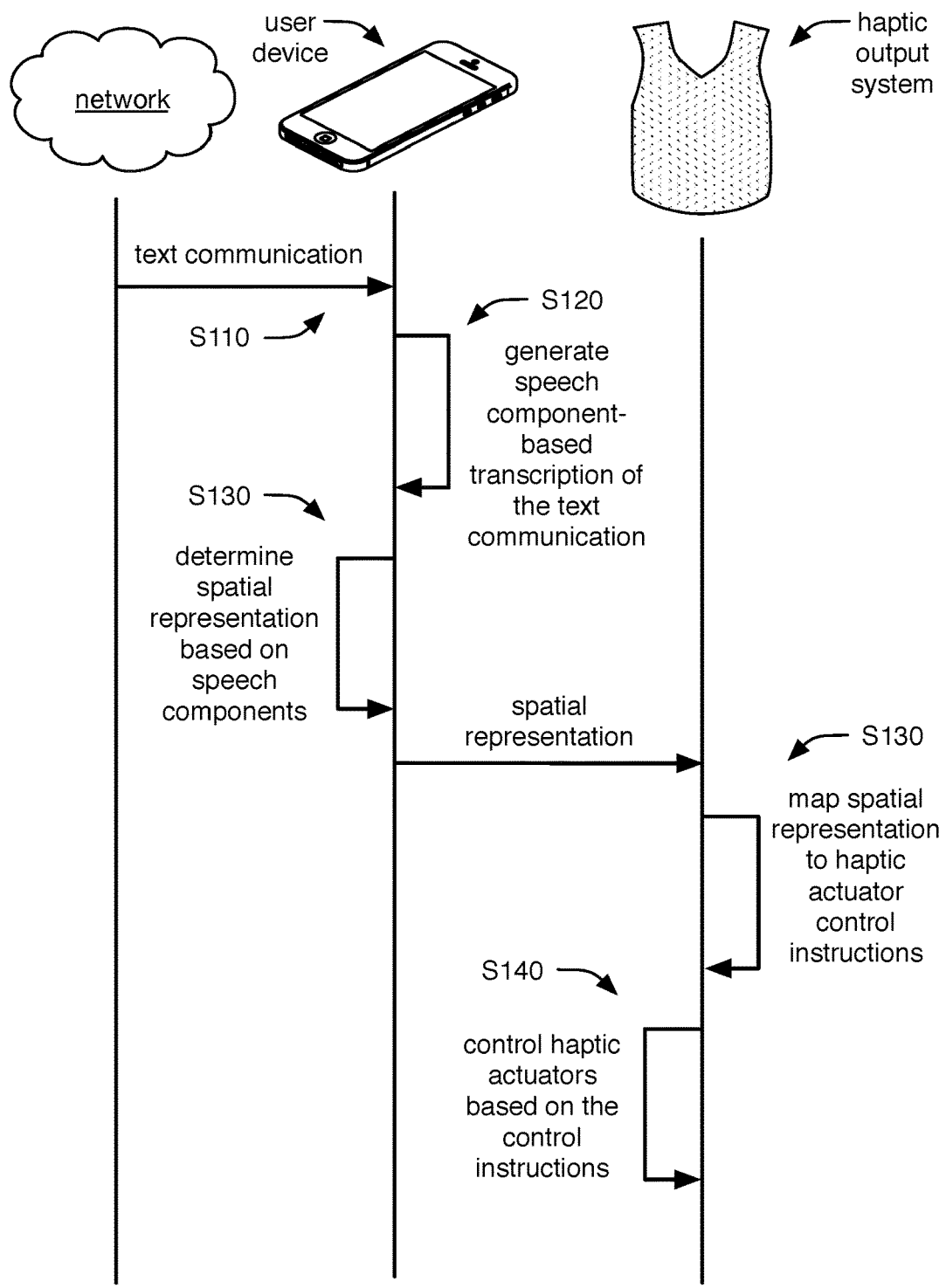

The system preferably receives input information from one or more communication modules, and provides stimuli (e.g., through sensory output devices in proximity to the user), and can optionally include one or more sensors (e.g., configured to receive and/or generate one or more input signals), power modules, and/or computational modules (e.g., as shown in FIGS. 6A-6B). The device components associated with the stimuli are preferably disposed in a single device, but can additionally or alternatively be disposed across a plurality of devices, and/or be disposed in any other suitable manner.

Figure 4A:
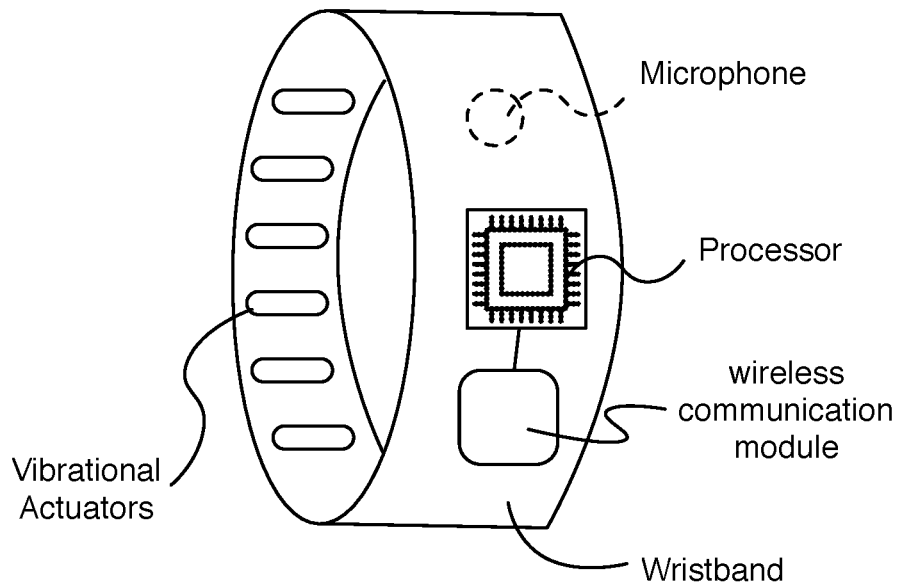
FIGS. 4A-4C depict examples of a device used in a system and/or method for transforming language inputs into haptic outputs.
Figure 4B:
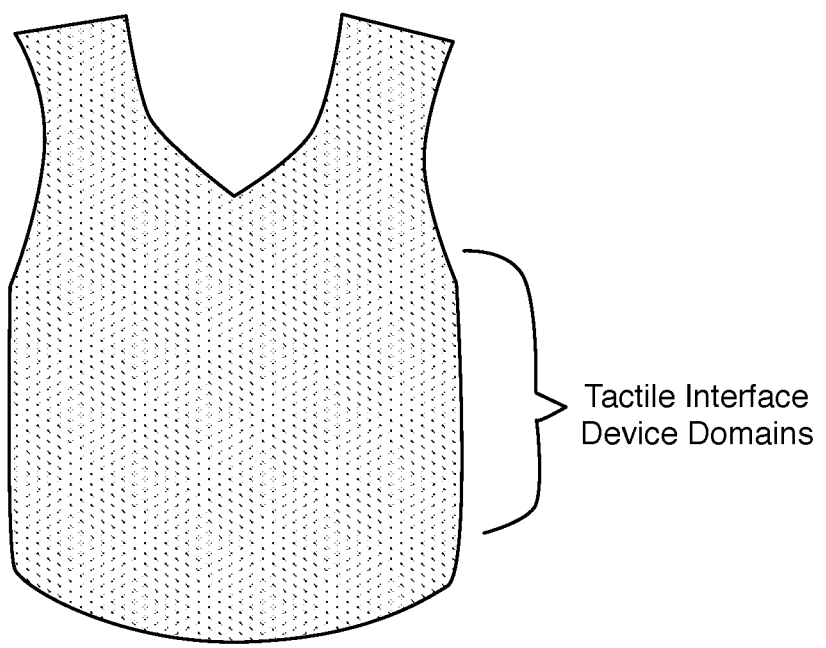

The stimuli can be provided by a plurality of tactile interface devices (e.g., haptic actuators, electrical stimulators, etc.) in a spatial distribution (e.g., multidimensional spatial distribution), each of which can provide a variety of available output stimuli with different stimulus parameters (e.g., as shown in FIGS. 4A-4B). The device(s) can provide haptic stimuli through the tactile interface devices, and in specific examples, can include an array of tactile interface devices operable to provide configurable haptic stimuli to a user. The tactile interface devices can include vibration motors (e.g., eccentric rotating mass (ERM) devices), Linear Resonant Actuators (LRAs), piezoelectric devices, and/or any other suitable devices (and/or combinations thereof, such as hybrid devices incorporating both ERM and LRA elements).

The device(s) can additionally or alternatively be operable to provide one or more of: auditory stimuli, electrical stimuli (e.g., peripheral stimuli, etc.), olfactory stimuli, taste stimuli, and any other suitable form of stimulus.

The spatial distribution (e.g., array) of tactile interface devices can have a density from 5 devices per $cm^2$ to 50 devices per $cm^2$, or any other suitable density. Furthermore, the spatial distribution of tactile interface devices can be configured with any suitable morphological aspects. The tactile interface devices are preferably arranged in one or more arrays (e.g., high-density arrays) but additionally or alternatively arrays of any suitable density. The arrays can include multidimensional arrays (e.g., planar array, 3-dimensional volumetric array, array defined substantially along one or more device surfaces, etc.), single-dimensional arrays (e.g., linear array, curvilinear array, etc.), and/or any other suitable arrays. For example, the device can include a two-dimensional array (e.g., defined substantially on a plane, defined on a curved and/or bent surface, etc.). The arrays can be configured as one or more of: a circular array, an ellipsoidal array, a polygonal array (e.g., a triangular array, rectangular array, a pentagonal array, a hexagonal array, etc.), a circumscribing array, an amorphous array, an array substantially spanning the support structure with which the array is integrated, and any other suitable array type. Additionally or alternatively, the device can include an irregular distribution of tactile interface devices (e.g., arranged substantially on a surface and/or within a volume of the device) and/or any other suitable arrangement of tactile interface devices. Furthermore, the spatial distribution (e.g., array) can be configured across different layers of the overarching device coupled to the user.

In a first embodiment, as shown in FIG. 4A, the array of tactile interface devices is integrated with a wrist-region wearable band device, wherein the array is distributed circumferentially about the band surface and coupled to electronics that facilitate provision of haptic stimuli. In this embodiment, the system comprises a housing operable to 1) contain electronics for powering the tactile interface devices and transitioning the tactile interface devices between different modes and 2) support the array of tactile interface devices while positioning the array of tactile interface devices in a manner such that the user can sense stimuli provided by the array. The housing can thus be coupled to or otherwise include a fastener that couples the system to a user. The fastener and housing can be of unitary construction or otherwise physically coextensive, or can be otherwise connected, coupled, or couplable. The fastener is preferably operable to be easily and/or repeatably fastened and unfastened manually by the user, and in specific examples, can include a latch, snap, buckle, clasp, hook-and-loop fastening mechanism, and/or any other suitable fastening mechanism, and/or can be operable to expand and contract (e.g., including an elastic element, such as an expansion band; including a deployment clasp, butterfly clasp, or other clasp that is physically coextensive when unclasped; etc.).

In a second embodiment, the tactile interface devices are configured to be carried with a user (e.g., worn by the user, in proximity to the user). In this embodiment, the tactile interface devices are preferably integrated into a wearable garment, wherein the garment can comprise a top (e.g., shirt, vest, etc.), a bottom (e.g., pants, shorts, skirt, etc.), a headpiece (e.g., headband, earmuffs, hat, etc.), a backpack, an undergarment, socks, and any other suitable form of garment. Additionally or alternatively, the tactile interface devices can be configured to be mechanically coupled to the wearable garment (e.g., retained in one or more pockets of the garment, attached by fasteners such as buttons, clips, magnets, and/or hook-and-loop fasteners, attached by adhesive, etc.). Additionally or alternatively, the tactile interface devices can be configured to attach directly to a user (e.g., by suction, adhesive, etc.), preferably to one or more skin surfaces of the user. Additionally or alternatively, the tactile interface devices can be incorporated into one or more wearable devices (e.g., a head-mounted wearable device, etc.) and/or implanted devices. Additionally or alternatively, the tactile interface devices can be incorporated into prosthetic devices (e.g., lower limb prosthetics, upper limb prosthetics, facial prosthetics, etc.). In an example, such as shown in FIG. 4B, the array of tactile interface devices can be integrated with a vest garment operable to be worn by a user as the user moves about in his/her daily life.

Figure 4C:
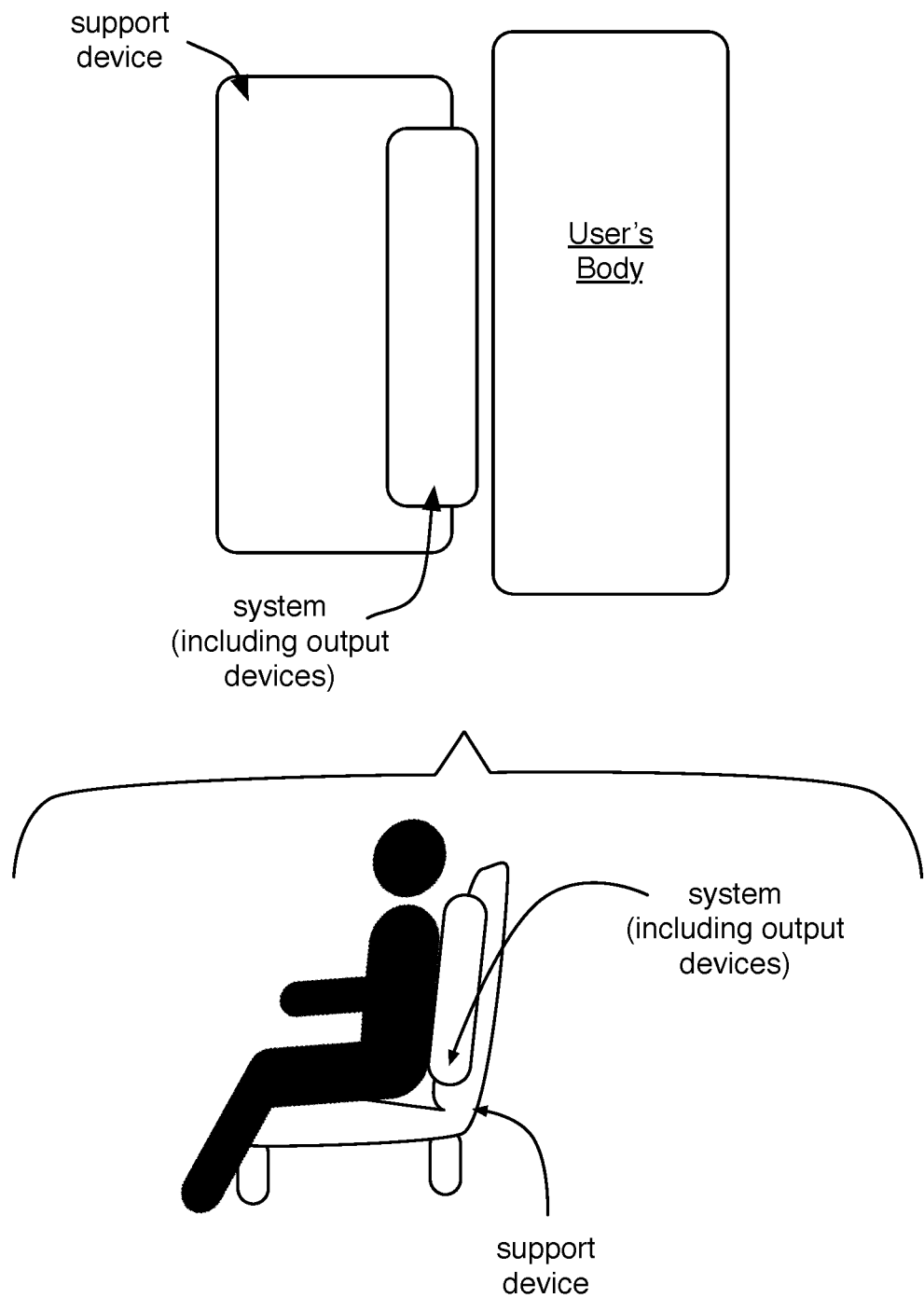

In a third embodiment, such as shown in FIG. 4C, the tactile interface devices are configured to be mechanically coupled to the user by a support device that supports the user (e.g., by a support element of the support device). For example, the tactile interface devices can be integrated into the support element and/or arranged between the user and the support element (e.g., resting on top of the support element). The support devices can include seats, couches, beds, platforms (e.g., for sitting and/or standing on), walls, inclined surfaces (e.g., configured to support a leaning user), and/or any other suitable support devices, as described in U.S. application Ser. No. 15/661,934 titled "Method and System for Determining and Providing Sensory Experiences" and filed on 27 Jul. 2017, which is herein incorporated in its entirety by this reference.

Additionally or alternatively, the tactile interface devices can be disposed in a device configured to be held by the user (e.g., hand-held, held between an arm and torso of the user, held between the legs of the user, etc.). Additionally or alternatively, the tactile interface devices can be disposed in a device configured to rest on the user (e.g., retained against the user by gravity), such as a blanket. However, the tactile interface devices can additionally or alternatively be coupleable to the user (and/or otherwise configured to interact with the user) in any other suitable manner.

In some embodiments, some or all of the tactile interface devices (and/or any other suitable sensory output devices or other devices associated with the system) can be configured to be attached (e.g., permanently, removably, repeatably, etc.) to one or more attachment substrates, such as described in U.S. application Ser. No. 15/716,195 titled "System and Method for Sensory Output Device Attachment" and filed on 26 Sep. 2017, which is herein incorporated in its entirety by this reference. However, the tactile interface devices can additionally or alternatively be attached and/or otherwise coupled to the system in any other suitable manner.

Each tactile interface device (and/or other output unit) is preferably controlled by independent signals and configured to actuate independently from the other output units. Alternatively, a group of output units (e.g., a cluster or subset of the output units) can be independently controlled, such that the group of output units can operate independently from the other output units. Each controlled subset (e.g., individual output unit or cluster) can include one or more output units of the same or different types. In variations, in addition to or in alternative to controlling subsets of actuators (e.g., overlapping and/or disjoint subsets) to convey information as a function of features (e.g. in a first group for a first phoneme or other language component; in a second group, including only actuators not included in the first group, for a second phoneme or other language component; in a third group, including a subset of actuators of the first and second groups, for a third phoneme or other language component; etc.), subsets can be used to map a numerical input to a multi-actuator output. In an example, the actuators can be controlled to make the impression of upward and/or downward "sweeps" (e.g., turning actuators, such as spatially consecutive actuators, on and off in quick succession).

Each controlled subset is preferably individually identified, such that it has a locally unique identifier (e.g., index value), but can alternatively share an identifier with a second controlled subset of the device, or be otherwise identified. Each controlled subset (or the respective identifier) is preferably associated with a known, stored spatial position on the device (controlled subset position). The controlled subset position can include an arcuate position, radial position, position along an axis (e.g., lateral axis, longitudinal axis, etc.), set of coordinates, grid position, position relative to another device component (e.g., sensor, different output unit, etc.), or be any other suitable position. The controlled subset positions can be stored by the device (e.g., on volatile or non-volatile memory), can be encoded (e.g., implicitly, explicitly) via a re-indexing module (e.g., reindexing array), and/or stored (and/or otherwise made available) by any other suitable system. However, indexing and/or storing can additionally or alternatively be implemented in any other suitable manner.

Each controlled subset is preferably wired in parallel relative to other controlled subsets of the device, but can alternatively be wired in series, wired in a combination of in parallel and in series, or be wired in any other suitable manner (or not be wired). The controlled subsets of the device are preferably controlled by the processor, but can additionally or alternatively be controlled by a remote computing system (e.g., server system), external device (e.g., mobile device, appliance, etc.), and/or any other suitable computing system.

The system 100 can additionally or alternatively include one or more sensors (e.g., wherein sensors are included with the same device(s) that provide the stimuli, wherein sensors are distinct from the devices that provide the stimuli, etc.), which can optionally be configured to provide input information (e.g., supplementing and/or in place of the information received via the communication module). The sensors can include local sensors (e.g., sensing an environment of the device and/or user), remote sensors (e.g., sensing a separate environment), virtual inputs (e.g., associated with a virtual environment), and/or any other suitable sensors in any other suitable configuration.

For example, the sensors can include one or more: cameras (e.g., CCD, CMOS, multispectral, visual range, hyperspectral, stereoscopic, etc.), spatial sensors (e.g., inertial measurement sensors, accelerometer, gyroscope, altimeter, magnetometer, etc.), location sensors (e.g., GPS, GNSS, triangulation, trilateration, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, and/or any other suitable sensors. However, the system can additionally or alternatively include any other suitable sensors.

The communication modules can include wired communication modules (e.g., configured to communicate by wired data connections, such as Ethernet, USB, power line, etc.) and/or wireless communication modules (e.g., radios). The wireless communication modules preferably support (e.g., enable communication using) one or more wireless communication protocols (e.g., WiFi, Bluetooth, BLE, NFC, RF, IR, Zigbee, Z-wave, etc.). However, the system can additionally or alternatively include any other suitable communication modules.

The power module can include one or more power input elements, power storage elements, and/or any other suitable elements. The power module is preferably an electrical power module with an electrical input (e.g., electrical power connection such as a wired connector or inductive loop) and/or electrical storage element (e.g., battery, supercapacitor, etc.), but can additionally or alternatively include any other suitable power input and/or storage elements. The power module can include a battery that is preferably electrically coupled (e.g., connected by conductive wires) to the powered system components, wherein the computational module preferably controls power provision (e.g., as described below), but power provision and/or battery management can additionally or alternatively be performed by any other suitable components.

The computational module can include one or more processors (e.g., CPU or other microprocessor, control circuit, relay system, etc.), computer memory modules (e.g., RAM), computer storage modules (e.g., hard disk drive, flash memory, etc.), and/or any other suitable elements. The computational module is preferably configured to control and/or receive information from the outputs, inputs, communication modules, power modules, and/or any other suitable elements of the system. The computational module can be distributed across multiple systems (e.g., remote server, personal computing device, wearable computing device, mobile computing device, etc.) and/or in the cloud, or can alternatively be implemented in a single computing system.

The computational module is preferably configured to control the controlled subsets (e.g., output units such as tactile interface devices, groups of output units, etc.) individually. In a first example, the processor is configured to provide control signals to each controlled subset (e.g., to a control element of each controlled subset, such as an actuator control circuit). Additionally or alternatively, in a second example, the processor is configured to selectively provide power from the power module to each controlled subset (e.g., by regulating the current provided to each output unit) or to selectively command each controlled subset to enter a mode or attain a set point parameter value (e.g., by communicating a command to an integrated controller of each output unit). However, the computational module can additionally or alternatively be configured to control the controlled subsets in any other suitable manner, or can be configured to not control the controlled subsets.

As described earlier, the system can include embodiments, variations, and examples of the device(s) described in U.S. application Ser. No. 14/750,626, titled "Providing Information to a User Through Somatosensory Feedback" and filed on 25 Jun. 2015, U.S. application Ser. No. 15/661,934, titled "Method and System for Determining and Providing Sensory Experiences" and filed on 27 Jul. 2017, and/or U.S. application Ser. No. 15/696,997, titled "Method and System for Providing Adjunct Sensory Information to a User" and filed on 6 Sep. 2017; however, the system can additionally or alternatively include any other suitable devices and/or device elements.

3. Method.

3.1 Receiving a Communication Dataset.

Block S110 recites: receiving a communication dataset, which functions to provide one or more sources of information that can be processed and delivered to the user in a new format, according to subsequent blocks of the method 100.

In Block S110, the communication dataset preferably includes text representations (e.g.; files; stored data, such as data stored in memory; data streams, such as data transmitted over a network connection or data link; etc.) containing text units (e.g., letters, symbols, characters, etc.), but can alternatively include non-text representations. In variations, the text representations can include representations in ACSII format (for English language text), Unix format (e.g., POSIX format), and any other suitable format. However, the communication dataset can alternatively include character encoding, such as ISO 8859 type encoding, UTF encoding, Unicode encoding, ANSI encoding, OEM encoding, and any other suitable encoding (e.g., for accented characters, for non-ASCII characters, for European language characters, for non-Western language characters). In one example, the communication dataset includes both English characters and emojis (e.g., wherein each emoji can be translated into a text description such as a Unicode character name; wherein each emoji is directly represented in the intermediary information, such as by a supplemental 'speech component' defined in addition to the usual speech components of a language; etc.). However, the communication dataset can additionally or alternatively include non-text representations. For instance, variations of Block S110 can include receiving image representations (e.g., memes containing text), graphics interchange format (GIF) representations, video representations, and any other suitable representations (e.g., files, stored data, data streams, etc.) from which information (e.g., text data, numerical data, semantic meaning, conceptual information, etc.), such as information of potential interest to a user, can be extracted.

The language(s) represented in the communication dataset can include any suitable language or any suitable derivative of a language (e.g., Braille, sign language, etc.), from which the communication dataset can be generated.

Block S110 can implement one or more system components operable to collect data that is representative of communication in a textual (or other) formats. In relation to text communications, Block S110 can thus implement systems operable to access one or more of: text messaging applications, email applications, social network applications (e.g., Twitter, Snapchat, LinkedIn, etc.), messaging applications (e.g., WhatsApp, Viber, GroupMe, etc.), and any other suitable applications for communication.

Block S110 can include retrieving the communication dataset with system components operable to interface with the applications described above through application programming interfaces (APIs). As such, Block S110 can include implementing an API access process for each of a set of applications for conveying communications in textual format in order to receive the communication dataset. Additionally or alternatively, in relation to non-text formatted data, Block S110 can include extracting text data from other data formats (e.g., image data, video data, GIF data, audio data, etc.) using character extraction algorithms (e.g., optical character recognition, natural language processing, etc.) and/or machine vision techniques for extracting and processing character data from other data formats. However, Block S110 can additionally or alternatively include extracting other information from the received input data. In a first example, semantic meaning is extracted from text data (e.g., using natural language processing techniques), wherein the extracted semantic meaning (e.g., rather than and/or in addition to the received text data) is used as the communication dataset in other Blocks of the method 100 (e.g., the extracted semantic meaning is transformed into a set of speech components in Block S120). In a second example, conceptual information is extracted from non-text formatted data (e.g., using image, video, and/or audio processing and/or analysis techniques, such as image segmentation and object recognition), wherein the extracted conceptual information is used as the communication dataset in other Blocks of the method 100 (e.g., the conceptual information is transformed into a set of speech components in Block S120).

In a first specific example, the concept of a car can be extracted from an image of a street including a car and/or from an image of an object including text associated with a car make or model. In a second specific example, the concept of a siren or emergency can be extracted from audio including a siren noise. However, Block S110 can additionally or alternatively include extracting any other suitable information from any other suitable input information.

Block S110 can optionally include altering the communication dataset. For example, the dataset can be filtered, abridged, condensed, transformed, and/or altered in any other suitable manner. For example, in some variations, Block S110 can include translation of incoming communication data from one language to another language, prior to implementation of subsequent Blocks of the method 100 (with or without translation back to the original language after processing steps of the method 100 are conducted). However, translation of incoming communication data can additionally or alternatively occur at any other suitable point relative to other Blocks of the method 100.

In an example, Block S110 includes accessing iMessage™ data received at one or more of a user's smart device (e.g., iPhone™, iPad™, Apple Watch™), personal computer (e.g., MacBook™), and any other suitable device. In another example, Block S110 includes accessing Twitter™ feed or messaging data associated with a messaging platform upon implementation of an authentication protocol associated with a Twitter API (or other API). In another example, Block S110 includes receiving email data upon implementation of an authorization protocol. In another example, Block S110 includes transforming PDF data to text data using an optical character recognition algorithm. In another example, Block S110 includes transforming audio data into text data.

However, Block S110 can additionally or alternatively include receiving any other suitable input information (e.g., as or in place of the communication dataset) in any suitable format. For example, the communication dataset (e.g., received as text) can include news (e.g., headlines, articles, summaries, numerical representations, such as representations of investment- and/or sports-related news, etc.; received via a news app of a user device, via radio broadcast, etc.), notifications (e.g., associated with a user device such as a smart phone), reading material such as long-form reading material (e.g., articles, books, etc.), and/or any other suitable information. In examples, the communication dataset can include (e.g., in text representation, numerical representation, and/or any other suitable representations) stock values and/or changes, sporting event scores and/or other results, and/or weather conditions and/or forecasts.

In one variant, the input information includes information related to a user's surroundings and/or the surroundings of a system component (e.g., sensor), such as information associated with nearby objects and/or people (e.g., wherein Block S110 includes extracting information, such as text, semantic meaning, conceptual information, and/or any other suitable information, from the input information). In a first example of this variant, the system includes an image sensor (e.g., camera), and the text input includes text recognized in images captured by the image sensor (e.g., automatically detected, such as by performing image segmentation, optical character recognition, etc.), and/or other extracted information (e.g., conceptual information) includes information discerned from the images (e.g., as described above). For example, Block S110 can include transformation an image of a sign containing a message or string of characters in the user's environment into character data, for instance, if a user is in transit and the sign contains information related to safety or travel information (e.g., in a foreign country train depot). In a second example, the system includes an audio sensor (e.g., microphone), and the text input includes text associated with sounds sampled by the audio sensor (e.g., transcriptions of speech), and/or other extracted information (e.g., conceptual information) includes information discerned from the sounds (e.g., as described above). In a third example, the method includes determining characteristics about a nearby person (e.g., identity, physical characteristics, emotional state, etc.) based on the sensor information, and the text input can include a representation of those characteristics, and/or any other suitable information determined based on those characteristics (e.g., social network connections of the person, determined based on the identity), and/or other extracted information (e.g., conceptual information) includes information discerned from the characteristics and/or information determined based on the characteristics. However, the input information can include any other suitable information.

In some embodiments, all or some of the communication dataset is generated (e.g., before being received in Block S110; such as generated by a human other than the user, using an electronic device remote from the sensory output system) using a text-based input technique (e.g., typing, character-wise input technique, etc.). The communication dataset can additionally or alternatively be generated based on audio inputs (e.g., speech transcription), be automatically generated (e.g., by a computing system), and/or be generated in any other suitable manner.

The communication dataset can be received (e.g., from a remote computing system, via a network such as the internet or a cellular phone service network) using one or more communication modules (e.g., wireless communication module), can be received from storage (e.g., storage of an electronic user device), and/or received in any other suitable manner.

However, Block S110 can additionally or alternatively be implemented in any other suitable manner.

3.2 Transforming the Communication Dataset into Speech Components.

Block S120 recites: transforming the communication dataset into a set of speech components, which functions to convert text data from Block S110 into a "continuous time" component representation. As such, Block S120 includes functions to provide a step for converting text data to a speech signal or subcomponents of a speech signal, from which encodings (e.g., haptic encodings) can then be generated in Block S130. Block S120 can thus transform communication data from Block S110 into components that are more amenable to continuous and/or time-domain encodings, associated with the encoding operation performed in Block S130. However, variations of Block S120 can alternatively generate components associated with non-continuous and/or non-time domain encodings.

In more detail, in relation to continuous/time-domain encodings in Blocks S120 and S130, it is preferable to have entire encodings received by the brain of the user, in order for the user to be able to interpret a speech component associated with an entire encoding. Given that some language forms are fundamentally spoken and/or acoustic, it can be more efficient for a user to perceive haptic encodings transformed from speech, rather than haptic encodings derived from specific characters of written language. Alternatively Block S120 and S130 can include transformation of text characters directly to haptic encodings. In such an example, each letter of an English word can be encoded and presented to the user (e.g., using a motor, pattern of motors, or combination of motors for haptic stimuli), such that the user must perceive and remember each letter in order for the user to perceive the entire English word.

In one variation, Block S120 can include implementing a text-to-speech (TTS) engine that extracts a set of acoustic components (e.g., a closed set of acoustic components) from the communication data of Block S110. The TTS engine can implement a synthesizer that converts language text into speech and/or renders symbolic linguistic representations (e.g., phonetic transcriptions, phonemic transcriptions, morphological transcriptions, etc.) into speech components without generating sound. The acoustic components can include phonemes (or sounds at the resolution of phonemes), or finer-time-scale acoustic components used to construct phonemes. As such, the acoustic components can be phonemes, sub-phoneme components, and/or super-phoneme assemblies, and can include aspects of tone, stress, or any other suitable phoneme feature. Block S120 can, however, alternatively generate non-phoneme-associated components (e.g., phones, senones, subphones, diphones, triphones, quinphones, diphthongs, triphthongs, utterances, fillers, etc.) or any other suitable components.

Figure 3:
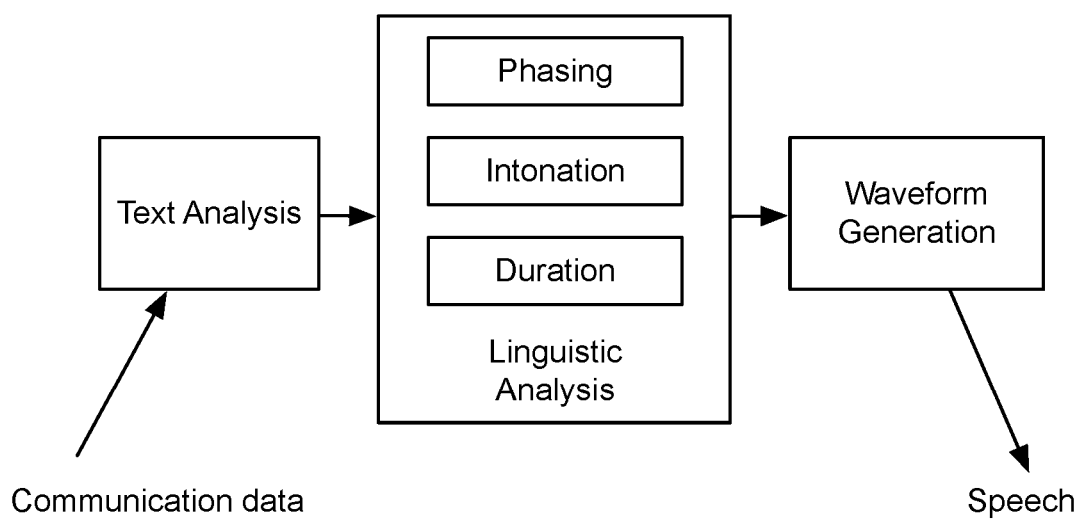
FIG. 3 depicts a variation of a portion of a method for transforming language inputs into haptic outputs.

In an example of this variation, a TIS engine implemented can include a front-end component that converts the communication data of Block S110 with a text normalization process (e.g., a pre-processing operation, a tokenization operation), assigns a phonetic transcription to each component output from the text normalization process, and then parses the phonetic transcriptions into units (e.g., phrases, clauses, sentences). As such, the front-end component can implement a grapheme-to-phoneme conversion or any other suitable conversion, from which acoustic components of speech are extracted. In a first specific example, the grapheme-to-speech component (e.g., grapheme-to-phoneme) conversion is performed based on a predefined pronunciation dictionary (e.g., manually generated lexicon), such as a dictionary that maps text input components (e.g., graphemes, words, etc.) to speech components (e.g., phonemes, phones, syllables, etc.). A second specific example includes generating a pronunciation dictionary (e.g., as described above), then training a sequence model (e.g., weighted finite state transducer) on the pronunciation dictionary (e.g., to generate sequences of pronunciation units associated with input sequences, such as input words broken down into characters and/or other graphemes), wherein the grapheme-to-speech component conversion is performed using the resulting sequence model. A third specific example includes training a sequence-to-sequence model (e.g., neural network such as an RNN) to map from input sequences (e.g., grapheme sequences such as character strings) to sequences of speech components, wherein the grapheme-to-speech component conversion is performed using the resulting model (e.g., using the trained RNN to map the input text to a series of phonemes). The TTS engine, an example of which is shown in FIG. 3, can further include a back-end component that converts the symbolic linguistic representation into sound, from which acoustic components (e.g., phonemes, sub-phoneme components, super-phoneme assemblies) can be classified. However, Block S120 can omit a back-end component and never translate linguistic representations into sound. For example, a transcription (e.g., phonetic or phonemic transcription) generated from the text input can be used directly in Block S130 to generate encoded outputs (e.g., as shown in FIG. 1B). Furthermore, variations of Block S120 can implement any other suitable TTS engine structure.

Figure 5A:
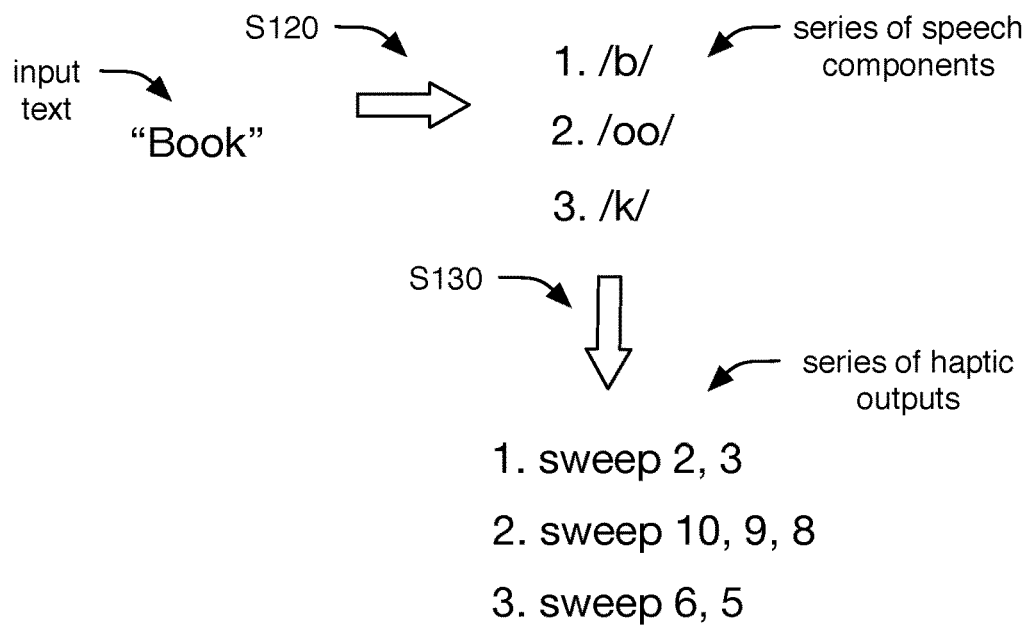
FIG. 5A depicts a specific example of transforming input text into haptic outputs according to an embodiment of the method.

Upon generation of the speech/acoustic components, Block S120 can further include classification of the components in a labeling operation, from which encoded outputs are generated in Block S130. In a specific example, Block S120 can label each phoneme output with one of 47 labels corresponding to 47 phonemes (including vowel phonemes, consonant phonemes, and diphthongs) in English (e.g., as shown in FIG. 5A). In another example, Block S120 can label each phoneme output with one of 45 labels corresponding to 45 phonemes (including vowel phonemes, consonant phonemes, and diphthongs) in German. In another example, Block S120 can label each phoneme output with one of 41 labels corresponding to 41 phonemes (including vowel phonemes, consonant phonemes, and diphthongs) in Mandarin, with additional sub-labels associated with tonal components of phonemes. However, labeling can be implemented in any other suitable manner depending on language specific features.

Block S120 can additionally or alternatively include determining the speech components based on morphological aspects of the text input. For example, Block S120 can include generating a morphophonemic transcription of the text input, in which some elements of the text input are represented by a corresponding phoneme, whereas others are represented by a corresponding morpheme. In a first specific example, the plural morpheme |z| supplants all or some of the associated phonemes (e.g., both the /s/ of "pets" and the /z/ of "beds" are represented by |z|; the /Iz/ of "churches" can also optionally be represented by |z|). In a second specific example, the past tense morpheme Ied supplants all or some of the associated phonemes (e.g., terminal /d/, /t/, and/or /Id/ phonemes). However, the speech components can additionally or alternatively have any other suitable representation.

Block S120 can optionally include determining the language (or languages) associated with the text input, preferably determining a set of relevant speech components based on the determined language (e.g., the phonemes associated with the language), wherein the series of speech components (e.g., the phonemic transcription) can be determined based on the set (e.g., selecting only speech components included in the set). However, the set of speech components can additionally or alternatively be determined in any other suitable manner.

Furthermore, Block S120 can additionally or alternatively be implemented in any other suitable manner. For instance, some variations of Block S120 may additionally or alternatively implement non-phonetic techniques including one or more of: a discrete cosine transform (DCT) operation that automatically transforms acoustic components provided by a TIS engine into frequency bins associated with encoded outputs (e.g., motors, patterns of motors, combinations of motors, etc.) of Block S130; a fast Fourier transform (FFT) operation, an autoencoder neural network operation, and any other suitable operation applicable to windows of rendered acoustic outputs, which can be classified to a set of constituent speech components. Block S120 can additionally or alternatively include generating the set of speech components (and/or any other suitable information) based on non-text input information. For example, in an embodiment of Block S110 in which non-text information (e.g., conceptual information) is extracted or otherwise determined, Block S120 can optionally include generating a set of speech components directly from the non-text information (e.g., using a data structure, such as a lookup table, that associates the non-text information with speech components). In a specific example, the concept of a nearby car can be transformed directly into the phoneme series /c/, /a/, /r/ (e.g., rather than transforming the concept into the text representation "car" and then transcribing the text representation into a phoneme series).

While conversion of text (and/or other input information) to speech components is described above, Block S120 can additionally or alternatively include transforming the communication dataset of Block S110 into any other suitable "continuous time" component representation. Still alternatively, Block S120 can be omitted from implementation of some variations of the method 100, such that the method 100 generates encoded haptic outputs either directly through communication data (and/or other data) received in Block S110, or through other means. In such an example, some syllabary languages (e.g., Japanese) can have direct mappings between text symbols and sound, and thus, speech components can be directly extracted from text data.

3.3 Transforming the Speech Components into Output Parameters.

Block S130 recites: implementing a transformation model with the set of speech components, the transformation model operable to encode the set of speech components across a set of output parameters in a device domain, the device domain associated with a distribution of tactile interface devices coupled to the user and stimulus parameters of the distribution of tactile interface devices. Block S130 functions to use speech components (e.g., phonemes, non-phonemes, etc.) extracted in Block S120, to generate haptic encodings associated with outputs of a device coupleable to the user. As such, Block S130 functions to facilitate transformation of speech components into signals that can be output at a device coupled to the user.

The transformation model preferably encodes the labels of Block S120 to haptic patterns executable using the array of tactile interface devices, wherein the haptic patterns are associated with control signals that activate devices of the array of tactile interface devices, and wherein the control signals can be executed in Block S140 of the method 100. The output parameters determined in Block S130 preferably define one or more sets (e.g., lists) of output devices and associated output settings (e.g., actuation intensities). The output parameters can additionally or alternatively define a function (e.g., a function over the mathematical space defined by the spatial distribution of output devices) that maps to the output settings (e.g., wherein output settings corresponding to a particular output device can be determined based on the value of the function at the location associated with the output device). The output settings can optionally include time dependence (and/or dependence on any other suitable variables), but can additionally or alternatively be constant.

In variations of Block S130 associated with labeled phonemes, the transformation model can encode each of the labeled outputs as one or more spatial aspects and/or device output parameters of the array of tactile interface devices. In relation to acoustic speech components described in Block S120 above, the transformation model(s) of Block S130 can transform, encode, or otherwise map feature sets associated with the set of objects to one or more of: subdomains (e.g., subregions, sub-clusters, sublayers, etc.) of the array of tactile interface devices; different stimulus aspects associated with the array of tactile interface devices; and any other suitable aspects of the array of tactile stimulus devices.

Speech components of Block S120 can be mapped to domains (e.g., layers, regions, clusters, areas, etc.) of the array of tactile interface devices, examples of which are shown in FIG. 4A. As such, different acoustic speech components, such as those generated in Block S120 (e.g., phonemes, sub-phoneme components, super-phoneme assemblies, phones, diphones, triphones, diphthongs, triphthongs, etc.), can be mapped to different domains of the array of tactile interface devices, and/or to different stimulus parameters such as described below, which can include actuation patterns (e.g., spatial and/or temporal patterns, such as pulses, sweeps, etc.) and/or any other suitable stimulus parameters. For instance, in a device variation that has a distribution (e.g., array) of tactile stimulation devices configured about a wristband wearable: each device of the distribution of tactile stimulation devices can be associated with a corresponding phoneme, such that different devices of the distribution of tactile stimulation devices can "play" phonemes in a specific pattern that corresponds to the message of the communication data of Block S110, and can be detected at a wrist region of the user. In another example, in a device variation that has a distribution (e.g., array) of tactile stimulation devices integrated with a vest worn by the user: each device of the distribution of tactile stimulation devices can be associated with a corresponding phoneme, such that different devices of the distribution of tactile stimulation devices can "play" phonemes in a specific pattern that corresponds to the message of the communication data of Block S110, and can be detected at the torso of the user. In a third example (e.g., employed using the wristband and/or vest described above, and/or using any other suitable system including a spatial distribution of tactile stimulation devices), stimulus parameters (e.g., sweeping actuation of neighboring and/or non-contiguous stimulation devices) can be mapped to speech component labels, such that concerted actuation of a plurality of the tactile stimulation devices (and/or of individual devices, such as described above) can "play" phonemes in a specific pattern that corresponds to the message of the communication data of Block S110, and can be detected by the user (e.g., at the user's wrist and/or torso). The different stimulus patterns can include patterns using the same and/or different stimulation devices from each other (e.g., a first pattern including clockwise sweeping actuation of a set of 8 devices, a second pattern including counterclockwise sweeping actuation of the 8 devices, a third pattern including pulsed actuation of 4 out of the set of 8 along with 4 other devices, etc.). Such multi-actuator mappings can potentially enable communication of a greater number of phonemes than the number of tactile stimulation devices in the system (e.g., communicating 47 unique phonemes using only 20 stimulation devices). For example, a first phoneme can be mapped to a clockwise sweep of 8 actuators, beginning at a fourth actuator of the device, and a second phoneme can be mapped to a counterclockwise sweep of 6 actuators, beginning at an eighth actuator of the device. However, variations of the example can associate devices of the array of tactile stimulation devices with speech components in any other suitable manner.

In the examples and variations described above, the domains/regions of the array of tactile stimulation devices can be fixed or dynamically modifiable. For instance, the subdomain can be dynamically modified, according to the encodings performed in Block S130, in order to match a character associated with a phoneme or symbol (e.g., an Emoji can be represented with a smiley-faced region of a dense array of devices).

In variations related to speech components described in Block S120 above, the transformation model can additionally or alternatively transform, encode, or otherwise associate speech component labels with a set with stimulus parameters of the array of tactile interface devices. In variations, the transformation operation can map different speech components (e.g., speech component label, phoneme tone, phoneme emphasis, etc.) to a range of stimulus types. In variations, stimulus parameters can include one or more of: output type (e.g., intermittent, pulsed, continuous, etc.); pulse pattern; pulse waveform characteristics (e.g., sinusoidal, square wave, triangular wave, wavelength, etc.), output amplitude, output intensity; output duration; out pulse duration, etc.), device domains involved in an output (e.g., a sweeping pattern using multiple devices), and any other suitable stimulus parameter. For instance, in a device variation that has a distribution of the array of tactile stimulation devices configured about a wristband wearable: each device of the array of tactile stimulation devices can output a specific stimulus parameter corresponding to a speech component, such that the devices can relay information not only to speech component labels (e.g., phoneme labels), but also more complex language aspects (e.g., phoneme tones, phoneme emphasis, etc.) and can be detected at a wrist region of the user. In another example, in a device variation that has a distribution of the array of tactile stimulation devices integrated with a vest worn by the user: each device of the array of tactile stimulation devices can output a specific stimulus parameter corresponding to a speech component, such that the devices can relay information not only to speech component labels (e.g., phoneme labels), but also more complex language aspects (e.g., phoneme tones, phoneme emphasis, etc.) and can be detected at a torso region of the user. However, variations of the example can associate stimulus parameters of the array of tactile stimulation devices with speech components in any other suitable manner.

In variations related to speech components described in Block S120 above, the transformation model can additionally or alternatively transform, encode, or otherwise associate speech component labels with complex or combined outputs of the array of tactile interface devices. In variations, the transformation operation can result in generation of encodings related to both subdomains and stimulus outputs available using the array of tactile stimulus devices.

Figure 5B:
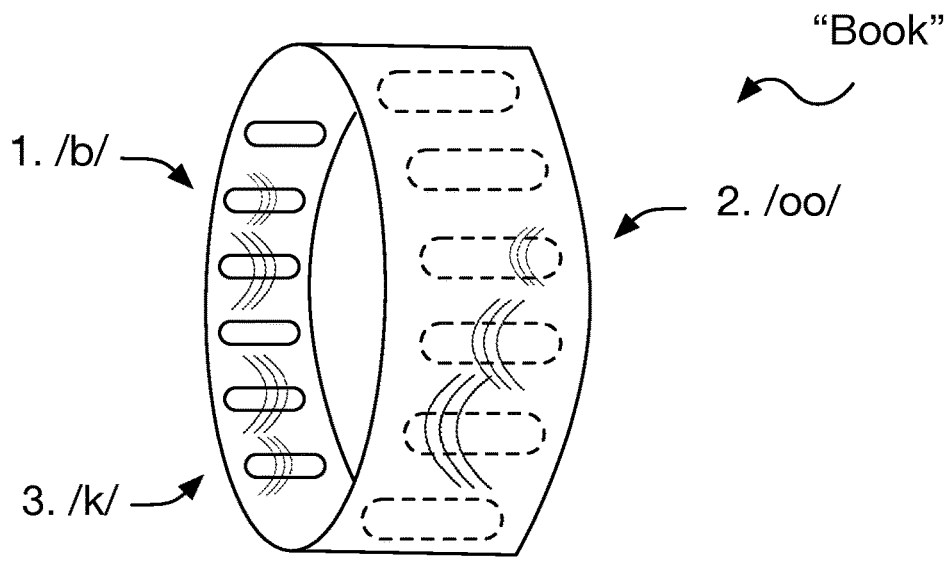
FIG. 5B depicts a specific example of an output of an embodiment of a method for transforming language inputs into haptic outputs.

In a first example, associated with the English language, the transformation model of Block S130 can assign each of 47 phoneme labels to specific devices of the array of tactile interface devices (e.g., distributed about a wristband, distributed across a vest, etc.), such that the array of tactile interface devices can "play back" stimuli associated with different phonemes in an order corresponding to portions of the communication received in Block S110. As shown in FIG. 5B, a wrist band can include an array of tactile interface devices (e.g., wherein devices and/or device actuation patterns are mapped to specific phonemes), which can be signaled to play the phoneme according to a pattern corresponding to the communication in Block S110. In a second example, associated with spoken Mandarin, the transformation model of Block S130 can assign each of 41 phoneme labels to specific devices of the array of tactile interface devices and four stimulus patterns (e.g., pulse patterns) associated with four spoken tones, such that the array of tactile interface devices can "play back" stimuli associated with different phonemes and different phoneme tones in an order corresponding to portions of the communication received in Block S110.

In the variations and examples described above, phoneme labels generated in Block S120 and corresponding to the communication data of Block S110 can be played back through the array of tactile interface devices in a manner similar to the natural timing of speech; however, play back can alternatively be implemented in a manner that does not mimic natural speech timing. As such, play back can be implemented with any suitable speed, frequency, cadence, pauses (e.g., associated with grammatical components of language), gain (e.g., amplitude of stimulation corresponding to "loudness" or punctuation), pattern (e.g., spatiotemporal pattern played using subarrays of the array of tactile interface devices, etc.), and any other suitable output component.

Similar to transformation models described in U.S. application Ser. No. 14/750,626, titled "Providing Information to a User Through Somatosensory Feedback" and filed on 25 Jun. 2015, the transformation model implemented in Block S130 can include one or more of the following: a linear Predictive Filtering/Coding (LPC) operation, that produces a set of filter coefficients and an energy parameter, wherein the filter coefficients can be converted to frequency-locations in a line spectral pair (LSP) representation (e.g., line spectral frequencies), and the energy parameter is mapped to a stimulus parameter (e.g., intensity, amplitude, duration, etc.); a decomposition transformation operation, where each dimension represents how much of a basis function is present; a single global axis mapping operation, wherein the possible range of frequencies may be discretized to a set of bands based on the number of tactile interface devices in the array and each element represents represent a band of frequencies; a multiple local axis mapping operation, wherein each LSP is given a different set of tactile interface devices to represent a range of frequencies; a coded local axis mapping operation, wherein each LSP is given a different set of axis representative of the frequency domain using a tree-type code (e.g., a binary code with different levels for different frequency ranges or functions); and any other suitable encoding or mapping operation.

The transformation model can be implemented using a computational module that retrieves a physical layout for the set of tactile interface devices (e.g., from storage, from inputs provided by a user or operator, etc.). Encoding and mapping can additionally or alternatively be implemented in any other suitable manner, such as described in U.S. application Ser. No. 14/750,626, titled "Providing Information to a User Through Somatosensory Feedback" and filed on 25 Jun. 2015.

3.4 Delivering the Outputs to a User.

Block S140 recites: executing control signals operable to deliver the set of output parameters to a user interfacing with the distribution of tactile interface devices. Block S140 functions to enable outputs to be delivered to the user through the tactile interface devices, according to the transformation and encoding algorithms of Blocks S120-S130. The control signals can be executed according to methods described in U.S. application Ser. No. 14/750,626, titled "Providing Information to a User Through Somatosensory Feedback" and/or in U.S. application Ser. No. 15/661,934, titled "Method and System for Determining and Providing Sensory Experiences" and filed on 27 Jul. 2017; however, the control signals can additionally or alternatively be executed in any other suitable manner. For instance, Block S140 can include receiving one or more user inputs operable to adjust a gain level (or other aspect) of output stimuli, such that the user can customize the "strength" of stimuli provided through the array of tactile interface devices.

3.5 Repetition.

Block S150 recites: repeating Blocks S110-S140 upon reception of additional incoming communication datasets. Block S150 can optionally function to provide real-time or near real-time communication updates to the user, such that the user is provided with communications through alternative sensory modes, as facilitated by the array of tactile interface devices. For example, Block S150 can be performed in real-time or near real-time (e.g., within a time threshold, such as 100 ms, 90 ms, 75 ms, 50 ms, 110 ms, 125 ms, 150 ms, 200 ms, 300 ms, etc.), such that information provided to the user has no perceptible lag (e.g., such that the user is unable to discern a delay between receipt of the communication dataset and perception of the corresponding tactile feedback). However, Block S150 can additionally or alternatively be performed such that information is provided to the user within a longer time period after receipt of the communication dataset (e.g., within 1 s, 2 s, 5 s, 15 s, 1 min, 10 min, etc.), and/or can be provided at any other suitable time. Block S150 can include repeating Blocks S110-S140 at a desired frequency (e.g., per unit time). Additionally or alternatively, Block S150 can include repeating Blocks S110-S140 based on any suitable trigger. For instance, Block S150 can include repeating Blocks S110-S140 with each incoming chat message, such that repetition is based on live communications from another party to the user. Additionally or alternatively, Block S150 can be implemented in any other suitable manner.

Furthermore, the method 100 can include any other suitable Blocks operable to promote provision of communications to the user, through an array of tactile interface devices, in any other suitable manner. For instance, the method 100 can include rapidly training a user to learn to correctly identify speech components associated with haptic outputs provided through an array of tactile interface devices, by providing pre-recorded speech with time-locked haptic outputs through the array of tactile interface devices. In a specific application, such a training protocol can allow users with high-frequency hearing loss to help them discriminate between commonly confused higher frequency phonemes (e.g., /th/, /f/, /s/, /h/, /k/, /z/, /b/, /dh/, /t/, /d/, /v/, etc.). For example, the method can include providing haptic outputs (e.g., at the array of tactile interface devices) representing phoneme components related to phonemes that users with high-frequency hearing loss (e.g., presbycusis) may have difficulty perceiving. In a first specific example, the method includes providing haptic outputs representing phoneme components (e.g., high frequency phoneme components) including /f/, /z/, /b/, /th/, /dh/, /t/, /d/, /s/, and/or /v/. In a second specific example, the method includes providing haptic outputs representing phoneme components (e.g., high frequency phoneme components) including /th/, /f/, /s/, /h/, and/or /k/. However, variations of the training protocol can alternatively be implemented for users with other impairments, users with no impairments, and/or for any other suitable phonemes or speech components.

Any or all elements of the method can be performed by any elements of the system, and/or by any other suitable elements (e.g., as shown in FIGS. 7A-7C and 8A-8C). For example, a first portion of the method (e.g., at least Block S110, and possibly additional elements such as all or some of Blocks S120 and/or S130) can be performed by a user device (e.g., smart phone), the results of which (e.g., text representation, series of speech components, series of haptic outputs, series of control instructions, etc.) can be transmitted (e.g., wirelessly) to a haptic output system, whereupon the haptic output system can perform a second portion of the method (e.g., the remaining elements not performed by the user device) based on the information included in the transmission. However, the elements of the method can additionally or alternatively be distributed between devices in any other suitable manner, or can be performed by a single device.

The method 100 and/or system of the preferred embodiment and variations thereof can be embodied and/or implemented at least in part in the cloud and/or as a machine configured to receive a computer-readable medium storing computer-readable instructions. The instructions are preferably executed by computer-executable components preferably integrated with the system 200 and one or more portions of the processor and/or a controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the field of biosignals will recognize from the previous detailed description and from the figures and claims, modifications and changes can be made to the preferred embodiments of the invention without departing from the scope of this invention defined in the following claims.

We claim:

1. A method for providing information to a user, the method comprising:
    establishing a physical interface between a user and a haptic output system comprising a plurality of haptic actuators defining a spatial distribution, each of the plurality of haptic actuators arranged at a nonzero offset from a skin surface of the user;
    receiving a text input representative of communication in a language;
    generating a speech component-based transcription based on the text input, wherein the speech component-based transcription comprises a series of speech components, the series of speech components comprising a set of phonemes and an English language plural morpheme;
    determining a series of spatial representations in a device domain of the haptic output system, the series of spatial representations corresponding to the series of speech components; and
    at the haptic output system, for each spatial representation of the series of spatial representations: providing a haptic output corresponding to the spatial representation, comprising, for each haptic actuator of the plurality:
  mapping a respective location of the haptic actuator to a corresponding location within the spatial distribution;
  based on a value of the spatial representation associated with the corresponding location, determining a respective actuation parameter; and
  controlling the haptic actuator to actuate based on the respective actuation parameter.

2. The method of claim 1, further comprising receiving a personal communication comprising the text input.

3. The method of claim 1, wherein the text input is received via SMS.

4. The method of claim 1, further comprising determining a set of speech components based on the language, wherein the set of speech components comprises each speech component of the series of speech components.

5. The method of claim 1, wherein:
  the plurality of haptic actuators substantially define a multidimensional array; and
  the spatial representation is defined on a multidimensional space, wherein the multidimensional space and the multidimensional array have equal dimensionality.

6. The method of claim 1, wherein the text input is received by a user device, the method further comprising transmitting the series of spatial representations from the user device to the haptic output system.

7. The method of claim 1, wherein:
  the haptic output system further comprises a wearable vest garment coupled to each haptic actuator of the plurality; and
  the method comprises mechanically coupling the haptic output system to the user comprises clothing the user with the vest garment, wherein each of the haptic actuators is arranged at a nonzero offset from the skin surface of the user through a material of the vest.

8. The method of claim 1, wherein:
  the plurality of haptic actuators are mechanically coupled to a vehicle; and
  the method comprises mechanically coupling the haptic output system to the user comprises supporting the user in a seat of the vehicle.

9. A method for providing information to a user, the method comprising:
  at a client of a user device, receiving a personal communication associated with the user, the personal communication comprising a text representation;
  generating a speech component-based transcription based on the text representation, wherein the speech component-based transcription comprises a series of speech components, the series of speech components comprising a set of phonemes and an English language plural morpheme;
  determining a series of haptic outputs corresponding to the series of speech components;
  at the client, wirelessly transmitting a dataset to a haptic output system coupled to the user, wherein the dataset comprises at least one of: the text representation, the series of speech components, and the series of haptic outputs; and
  at the haptic output system, providing each haptic output of the series of haptic outputs to the user, wherein each of the series of haptic outputs is provided at a nonzero offset from a skin surface of the user.

10. The method of Claim 9, wherein the text representation is received via a wireless communication technique.

11. The method of Claim 9, wherein the text representation is received via a messaging client of the user device.

12. The method of Claim 9, wherein the haptic output system comprises a plurality of haptic output devices.

13. The method of claim 12, wherein, for each speech component of the series of speech components, determining the corresponding haptic output comprises, based on the speech component, selecting a haptic output device of the plurality of haptic output devices to actuate.

14. The method of claim 13, wherein for each speech component of the series of speech components, determining the corresponding haptic output further comprises determining a time-dependent actuation pattern based on an emphasis of the speech component.

15. The method of Claim 9, wherein the haptic output system comprises a wearable garment.

16. The method of claim 15, wherein, while providing each haptic output to the user, the garment encircles a limb of the user.

17. The method of Claim 9, wherein the haptic output system is mechanically coupled to a seat.

18. A method for providing information to a user, the method comprising:
  receiving an information set for the user, the information set comprising audio data;
  generating a speech component-based representation based on the information set, wherein the speech component-based representation comprises a series of speech components, wherein the series of speech components comprises a set of phonemes and an English language plural morpheme;
  determining a series of haptic outputs corresponding to the series of speech components; and
  at a haptic output system coupled to the user, the haptic output system comprising a set of vibration motors, providing each haptic output of the series of haptic outputs to the user, each of the series of haptic actuators is provided at a nonzero offset from a skin surface of the user.

* * * * *